(12) United States Patent
Wei

(10) Patent No.: US 8,274,476 B2  
(45) Date of Patent: Sep. 25, 2012

(54) COMPUTER CURSOR CONTROL SYSTEM

(75) Inventor: Chih-Hsien Wei, Taipei (TW)

(73) Assignee: Primax Electronics Ltd., Taipei (TW)

( * ) Notice: Subject to any disclaimer, the term of this patent is extended or adjusted under 35 U.S.C. 154(b) by 785 days.

(21) Appl. No.: 12/263,759

(22) Filed: Nov. 3, 2008

(65) Prior Publication Data

US 2009/0189855 A1  Jul. 30, 2009

(30) Foreign Application Priority Data

Jan. 28, 2008 (TW) .............................. 97103089 A

(51) Int. Cl.
*G09G 5/08* (2006.01)
(52) U.S. Cl. ........................................................ 345/157
(58) Field of Classification Search .................. None
See application file for complete search history.

(56) References Cited

U.S. PATENT DOCUMENTS

2003/0048259 A1* 3/2003 Rowe ............................ 345/173
2007/0002014 A1* 1/2007 Lueder et al. ................. 345/157

* cited by examiner

*Primary Examiner* — Ke Xiao
*Assistant Examiner* — Ieesha Gillis
(74) *Attorney, Agent, or Firm* — Kirton McConkie; Evan R. Witt

(57) ABSTRACT

The present invention provides a computer cursor control system comprising a touchpad device and a cursor control program. The cursor control program displays a virtual pointer on a screen according to a finger's touch on the touchpad device and simultaneously moves a computer and the virtual pointer according to the finger's movement on the touch pad device. Finally, the compute cursor is moved to the virtual pointer's position responding to a switch signal generated by the touchpad device.

6 Claims, 4 Drawing Sheets

COMPUTER CURSOR CONTROL SYSTEM

FIELD OF THE INVENTION

The present invention relates to a cursor control system, specifically to a system for moving a cursor rapidly by means of providing a virtual pointer on a computer screen.

BACKGROUND OF THE INVENTION

Touchpad devices are usually installed in notebooks for controlling the movement of cursor.

There are two ways for touchpad devices to control the cursor movement, one is to move the cursor according to the relative coordinate and the other is the absolute coordinate.

The way of using relative coordinate to control the cursor movement is the same as that used for controlling cursor with a mouse. That is to say, the distance and the direction of the cursor is determined by finger's slipping direction and accumulated slipping displacement on touchpad. Most users do not get used to the relative coordinate mode since they have to slip their fingers on the small area of the touchpad repeatedly to accumulate enough amount of displacement if they want to move the cursor for a longer displacement on the screen.

To solve the problem of the relative coordinate operation mode, there exists an absolute coordinate operation mode for touchpad devices in the prior art. In absolute coordinate operation mode, a cursor on a screen is moved to a coordinate according to a finger's touch point on the touchpad. So users do not have to slip their fingers on the touchpad when using an absolute operation mode.

However, since the area of a touchpad is much smaller than that of a screen, the coordinate of the touch point on the touchpad usually can't be projected on the screen precisely. It is therefore users are not able to finely move a cursor to a desired position one time in absolute coordinate operation mode.

Therefore, there is a need of providing an improved system for controlling cursor movement with touchpad devices.

SUMMARY OF THE INVENTION

It is an object of the present invention to provide a system and a method for rapidly moving cursors to a desired position on a computer screen.

According to the present invention, it provides a computer cursor control system for controlling movement of a computer cursor on a computer screen connected to a host, the system comprising: a touchpad device, electronically connected to the host and comprising a pad, a left key and a right key, for generating a relative displacement signal according to a finger's touch on the pad and responding to the finger's operation on the touchpad to generate a switch signal; and a cursor control program installed in the host for executing the following steps: displaying a virtual pointer on the screen according to a touch position touched by the finger on the pad; moving the cursor and the virtual pointer simultaneously according to the relative displacement signal; and moving the cursor to the position of the virtual pointer when receiving the a switch signal.

In a preferred embodiment, the switch signal is issued when the pad is pressed down.

According to the present invention, it provides a cursor movement control method for controlling movement of a cursor on a screen, wherein the cursor movement is determined by a finger's displacement on an input device, comprising: displaying a virtual pointer on the screen according to a touch position touched by the finger on the input device; moving the cursor and the virtual pointer simultaneously according to the finger's displacement on the input device; and responding to a switching signal to move the cursor to the position of the virtual pointer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
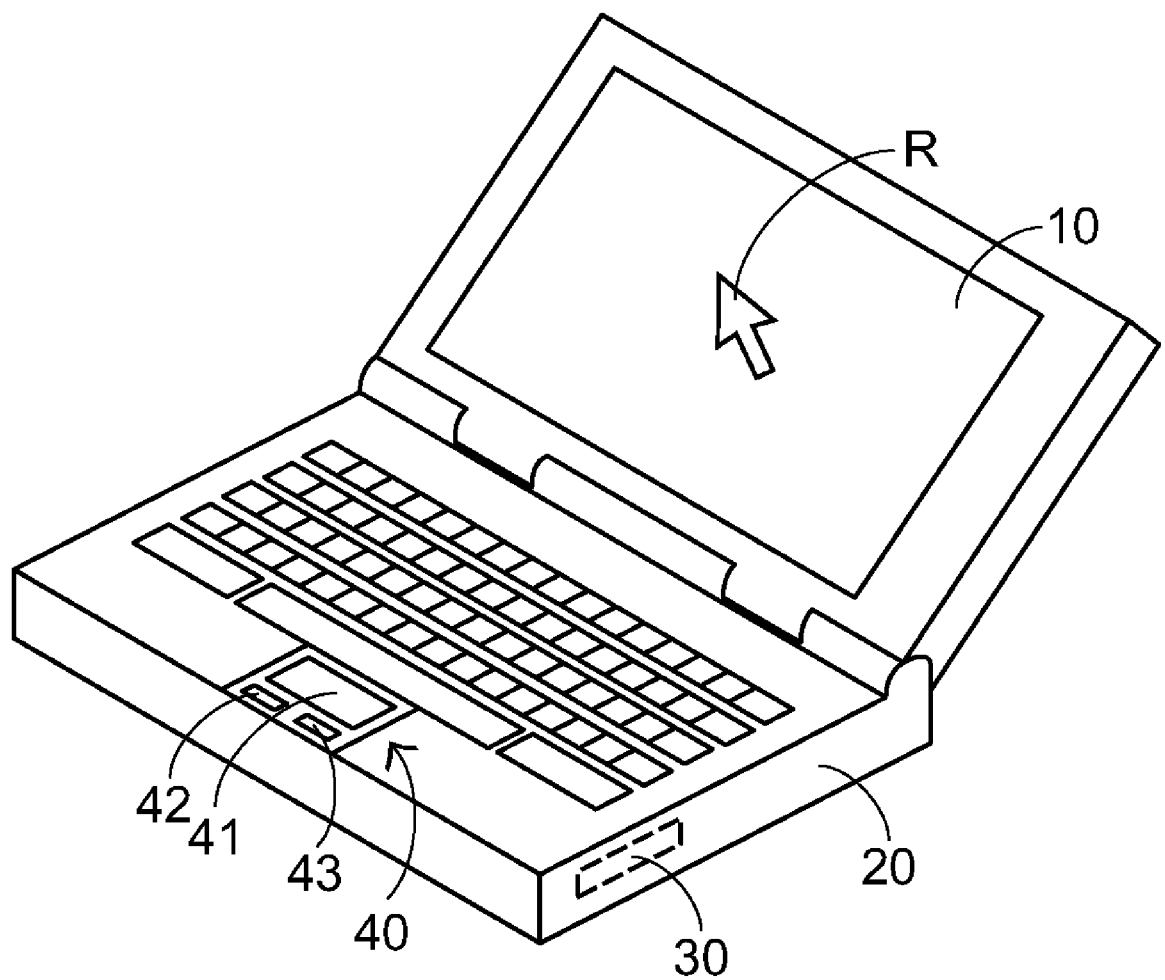
FIG. 1 is a diagram illustrating the cursor control system of the present invention used in a notebook.

Please refer to FIG. 1, which illustrates the cursor control system of the present invention used in a notebook. FIG. 1 shows a computer screen 10, a host 20 and a touchpad device 40. The touchpad device 40 comprises a pad 41, a left key 42 and a right key 43. The function of the left key 42 and a right key 43 are the same as those of a conventional mouse. The computer screen 10 shows a cursor R.

The cursor R is moved by slipping a finger on the pad 41 and the longer the accumulated displacement on pad 41, the larger displacement of the cursor R on screen 10. Besides, the computer cursor control system of the present invention also comprises a cursor control program 30 installed in host 20 for performing the cursor control method of the present invention.

Figure 2A:
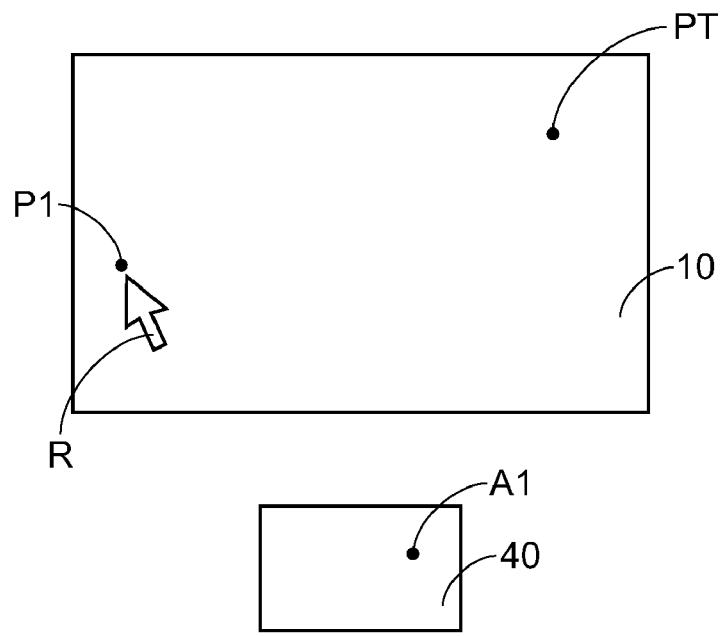
FIG. 2A-2D is a diagrams illustrating the cursor movement according to the method of the present invention.

Please refer to FIG. 2A to 2D, they illustrate the movement of cursor R of the present invention. As shown in FIG. 2A, cursor R is initially at position P1 of screen 10 and will be moved to a terminal position PT. According to the prior art method with relative coordinate operation mode, a user has to slip on the pad 41 repeatedly with his/her finger to move cursor R from position P1 to position PT. If the prior art method with absolute coordinate operation mode is used, a user has to touch the point, such as point A1, corresponding to the terminal position PT to move the cursor R to the terminal position PT. However, since the touch area of pad 41 is much smaller than that of screen 10, it is difficult to precisely project the point A1 to the terminal position PT.

Figure 2B:
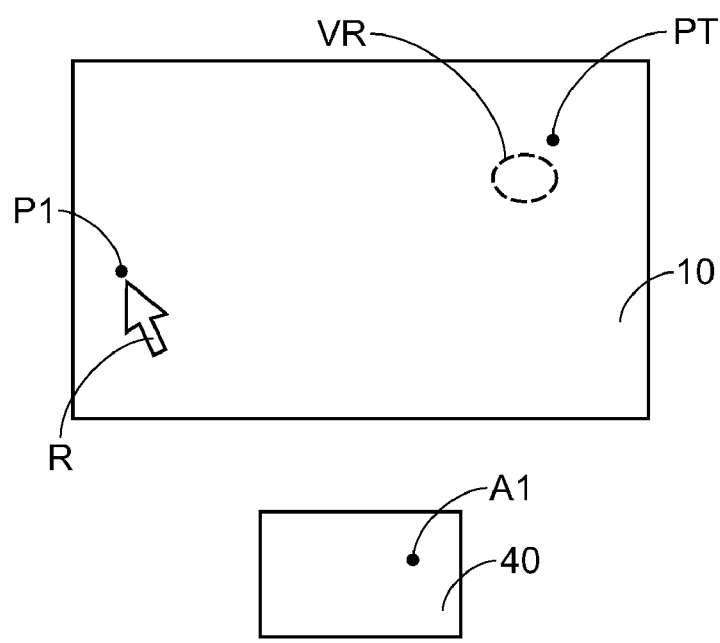
Figure 2C:
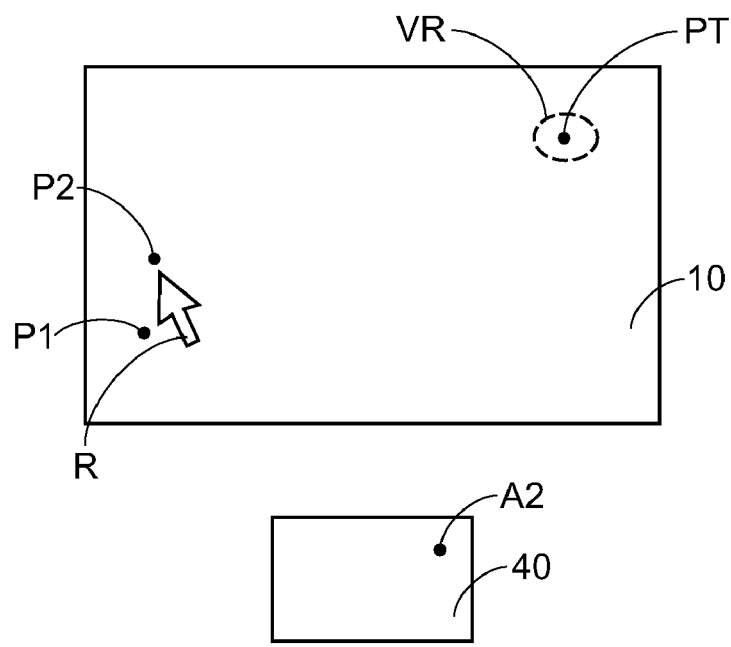
Figure 2D:
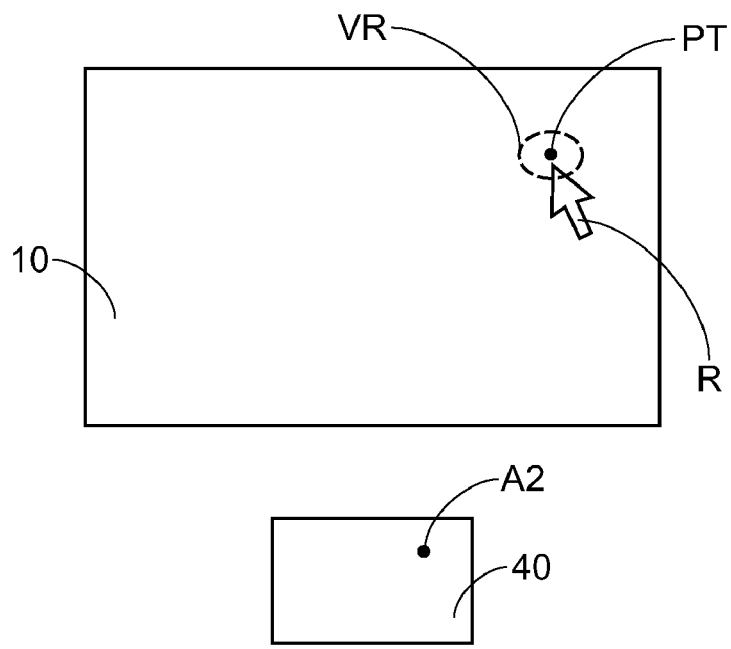

We'll describe the cursor control method of the present invention according to FIG. 2B to 2D. As shown in FIG. 2B, the user touched the pad 41 at a point, such as point A1, which approximately corresponds to the terminal position PT. At this moment, the cursor control program 30 displayed a virtual pointer VR on screen 10. Then, the user slipped his/her finger on the pad 41 toward the terminal position PT and now on the screen, both the cursor R and the virtual pointer VR are moved according to a displacement signal which is generated by the finger's displacement on pad 41. As shown in FIG. 2C, when the user moved his/her finger on the pad 41 from point A1 to point A2, the cursor R is moved from position P1 to position P2 and the virtual pointer VR is moved to the terminal position PT. Please refer to FIG. 2D, when the virtual pointer VR is moved to the terminal position PT, the user pressed down the pad 41 to generate a switch signal. The program 30 moved the cursor R to the virtual pointer's current position, i.e. PT, after receiving the switch signal. It is known in the art that a touchpad device can generate a switch signal by pressing down the pad, such as the disclosure of Taiwan Patent Publication No. 470193, titled "Touchpad device of digital electronic devices". So the detail structure of the touchpad device of the present invention will not be described in the specification.

Because a virtual pointer VR is displayed on screen 10, the user will clearly know the relationship between the finger's touch position on the pad and the terminal position PT on the screen and can precisely and rapidly move the virtual pointer VR to the terminal position PT. Then, by pressing down the pad 41 to issue the switch signal, the cursor R is moved to the terminal position PT without slipping finger on the pad 41 repeatedly.

Figure 3:
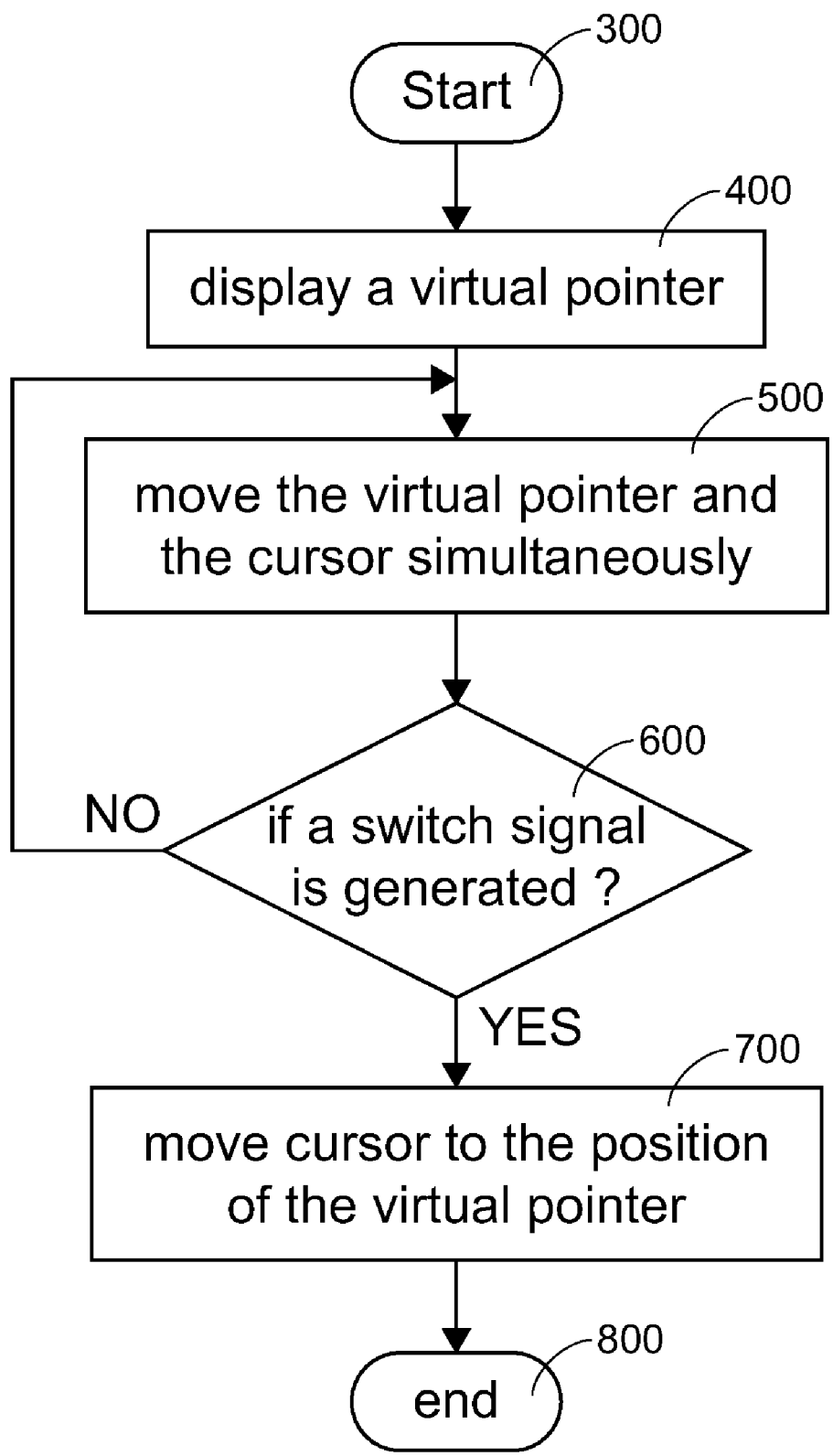
FIG. 3 is a flowchart of the cursor control program of the present invention.

Please refer to FIG. 3, it shows the flow chart of cursor control program 30.

Step 300: Start;

Step 400: display a virtual pointer VR on screen 10 according to finger's position on pad 41;

Step 500: move the virtual pointer VR and the cursor R simultaneously according to finger's movement;

Step 600: if the pad 41 is pressed down to generate a switch signal? if yes, go to step 700, if not, go back to step 500;

Step 700: move cursor to the position of the virtual pointer VR;

Step 800: end.

According to the above description, it is comprehended that the cursor control system of the present invention provides a clear direction to users by displaying a virtual pointer VR on screen that the users can know the relationship between the touched position on touchpad and terminal position on screen. Following that, a very short displacement on the pad can move the virtual pointer VR to terminal position and then the pressing down of the pad will move the cursor to the virtual pointer's position, i.e. the terminal position immediately. The present invention solve the problems of repeatedly slipping finger on pad in relative coordinate operation mode and not precisely projecting the touch position on pad to screen in absolute coordinate operation mode.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A computer cursor control system, for controlling movement of a computer cursor displayed on a computer screen connected to a host, the system comprising:
   a touchpad device, electronically connected to the host and comprising a pad, a left key and a right key, for generating a relative displacement signal according to a finger's touch on the pad and responding to the finger's operation on the touchpad to generate a switch signal; and
   a cursor control program, installed in the host for executing the following steps:
      displaying a virtual pointer on the screen at a first virtual pointer position according to a touch position touched by the finger on the pad, the first virtual pointer position and the position of the cursor being independent of each other;
      moving the virtual pointer from the first virtual pointer position according to the relative displacement signal; and
      moving the cursor to the position of the virtual pointer when receiving the switch signal.

2. The computer cursor control system according to claim 1, wherein the switch signal is issued when the pad is pressed down.

3. A cursor movement control method, for controlling movement of a cursor displayed on a screen, wherein the cursor movement is determined by a finger's displacement on an input device, comprising:
   displaying a virtual pointer on the screen at a first virtual pointer position according to a touch position touched by the finger on the input device, the first virtual pointer position and the position of the cursor being independent of each other;
   moving the virtual pointer from the first virtual pointer position according to the finger's displacement on the input device; and
   responding to a switching signal to move the cursor to the position of the virtual pointer.

4. The cursor movement control method according to claim 3, wherein the input device is a touchpad device comprising a pad, a left key and a right key.

5. The cursor movement control method according to claim 4, wherein the switch signal is issued when the pad is pressed down.

6. The cursor movement control method according to claim 1, wherein moving the virtual pointer includes moving the cursor and the virtual pointer simultaneously according to the relative displacement signal.

* * * * *